Patented Mar. 28, 1944

2,345,193

UNITED STATES PATENT OFFICE 2,345,193

ORGANIC DYE

Béla Gáspár, Brussels-Forest, Belgium, assignor to Chromogen, Incorporated, a corporation of Nevada No Drawing. Application May 6, 1939, Serial No. 272,292. In Great Britain May 19, 1938

9 Claims. (Cl. 260—240)

The present invention relates to a new method of manufacturing keto-oxy-trimethine dyestuffs which are believed to correspond to the general formula:

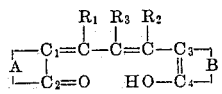

in which $C_1$ and $C_2$ are members of one ring system, and $C_3$ and $C_4$ are members of a second ring system and in which one of the symbols $R_1$ and $R_2$ represents a hydrocarbon radical, the other being a hydrogen atom or a hydrocarbon radical, and in which the symbol $R_3$ represents a hydrogen atom or a hydrocarbon radical. The new dyestuffs can be used for photographic purposes, for example, as filter dyes, antihalation dyes or sensitizers. The preparation of unsubstituted dyestuffs or dyestuffs substituted in the trimethine chain by halogen by employing as starting materials beta-ethoxy-acrolein-acetal, propargyl-acetal or mucochloric acid is already known.

The new method yields valuable keto-oxy-trimethine dyestuffs which are substituted in the trimethine chain as indicated in the general formula above and which are believed to be unknown. According to the new method 1,3-diketones or 1,3-ketone-aldehydes of the following general formula are used as the starting material:

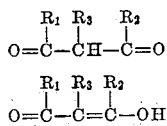

in which $R_1$ represents an unsubstituted or substituted alkyl or aryl residue and $R_2$ and $R_3$ a similar residue or hydrogen. By the choice of suitable substituents it is possible to modify the absorption properties of the dyestuffs within certain limits. Instead of the parent materials mentioned before, their functional derivatives, as, for example, the alkoxy derivatives, acetals, or the acyl compounds or anilides may be used. Typical compounds which correspond to this general formula are, for example, sodium-formyl-acetone, the anilide of formyl-acetone, acetyl-acetone, benzoyl-acetone, oxymethylene-aceto-phenone, the mono-anilide or di-anilide of acetylacetone or β-ethoxy-β-methylacrolein-acetate and similar substances.

The dyestuffs obtainable by the new process can be prepared in a much more economical manner than the known trimethine dyestuffs of a similar type, because the parent materials can be much easier prepared than the starting materials used hitherto.

For the preparation of the dyestuffs one molecular part of the above mentioned parent materials is condensed with 1 or 2 molecular parts of compounds which contain a reactive cyclic methylene group, adjacent to a CO group preferably in the presence of solvents which can be indifferent or can work as condensing agents. Besides or instead of these, there can be added condensing agents as, for example, amines. As compounds containing a reactive methylene group, compounds of the following general formula are suitable:

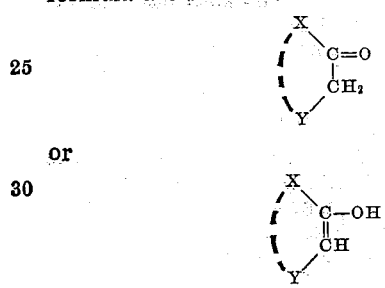

or in which X represents a carbon-, nitrogen-, sulphur- or oxygen-atom, and Y a double-bound carbon-atom or a nitrogen-, sulphur- or seleniumatom, and in which X and Y are members of a ring system which can be conjugated or not.

For example, pyrazolones, rhodanines, barbituric acid, thio-barbituric acid, indandione, isoxazolones, oxy-thionaphthene, oxyseleno-naphthene, oxindol or thio-oxindol, or their derivatives or their substitution products can be used.

Example 1

0.02 mol sodium formyl-acetone and 0.04 mol 1-phenyl-3-methyl-5-pyrazolone are dissolved in 50 ccs. methyl-alcohol and heated in a water bath for 10 hours at about 60° C. The colorless solution becomes first yellow, then dark red and finally dark magenta red. The reaction product is precipitated by water and purified by extracting with hot benzene. To accelerate the condensation there can be added 0.02 mol tri-ethylamine. The reaction is terminated after 2 hours in this case. The red dyestuff thus obtained has a melting point of 155° C. The maximum absorption is 535 μμ in methyl-alcohol. The dye has probably the following structural formula:

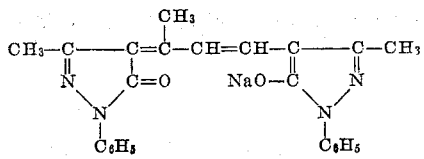

For the preparation of filter layers solutions of gelatin or cellulose derivatives are mixed with a solution of the dyestuff in organic solvents. The dyestuff is very easily decolorized in photographic developers. If a small amount of the dye is added to a silver halide emulsion the sensitivity will become slightly extended towards the red part of the spectral light.

*Example 2*

Instead of the sodium formyl-acetone used in Example 1 there is employed 0.02 mol formyl-acetone-anilide (Berichte der Deutschen Chemischen Gesellschaft, vol. 55, page 129) with the addition of 0.02 mol tri-ethylamine. The same dyestuff as in Example 1 is obtained.

*Example 3*

Instead of the sodium formyl-acetone used in Example 1 there is employed 0.02 mol acetyl-acetone with the addition of 0.02 mol tri-ethyl-amine. The mixture is boiled several hours under a reflux condenser. A red dyestuff is obtained. The methylalcoholic solution of the dye shows a maximum absorption at about 530 μμ.

*Example 4*

Instead of the sodium formyl-acetone there is employed 0.02 mol benzoyl-acetone with the addition of trimethylamine. The absorption of the resulting dyestuff is shifted towards the long wave part of the spectrum. The methylalcoholic solution shows a maximum absorption at about 560 μμ.

*Example 5*

Instead of the sodium formyl-acetone the monoanilide or dianilide of acetyl-acetone (Berichte l. c., vol. 37, page 1325 and vol. 56, page 148 respectively) is employed.

*Example 6*

In employing 1-p-sulpho-phenyl-3-methyl-5-pyrazolone instead of the 1-phenyl-3-methyl-5-pyrazolone used in Example 1 there is obtained by the same treatment a water-soluble dyestuff which can be isolated by precipitating with ether.

*Example 7*

Instead of the 1-phenyl-3-methyl-5-pyrazolone used in Example 1 there can be employed 3-phenyl-isoxazolone (Berichte l. c., vol. 24, page 502), barbituric acid, thio-barbituric acid or N-phenyl-rhodanine.

The tri-methine dyestuffs described in Examples 1 to 7 are symmetric tri-methine dyestuffs, i. e. their end groups are derived from the same parent material. Nevertheless, according to the new process also such dyes can be obtained whose end groups are derived from different parent materials. In this manner an extremely extensive variation and gradation of the properties of the dyestuffs can be obtained.

For this purpose the middle component of the dyestuff is first condensed with one mol of one end component and the condensation of the mono-condensation product is thereafter completed with a different end component either immediately or after the isolation of the mono-condensation product.

*Example 8*

When in the course of carrying out the condensation described in Example 1 the yellow to red solution is cooled after about 2 or 3 hours instead of terminating the condensation, beautiful yellow needles, having a melting point of 177° C., crystallize out. These crystals are believed to be the mono-condensation product 1-phenyl-3-methyl-4-acetyl-vinyl-5-pyrazolone of the following structural formula:

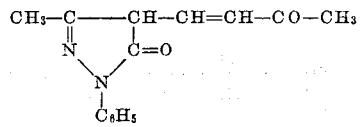

*Example 9*

The same mono-condensation product is also obtained if 0.01 mol formyl-acetone-mono-anilide and 0.01 mol 1-phenyl-3-methyl-5-pyrazolone are heated for 1 to 2 hours in methyl-alcohol with the addition of a condensing agent. Thereafter the solution is cooled and the yellow crystals formed are filtered off. The condensation can as well be performed by heating a mixture of sodium-formyl-acetone with aniline hydrochloride and the pyrazolone.

*Example 10*

0.01 mol of the mono-condensation product described in Examples 8 and 9 is further condensed with 1 mol 1-p-sulpho-phenyl-3-methyl-5-pyrazolone in methyl-alcohol with the addition of tri-ethylamine. A water soluble red dyestuff is obtained, which probably has the following formula:

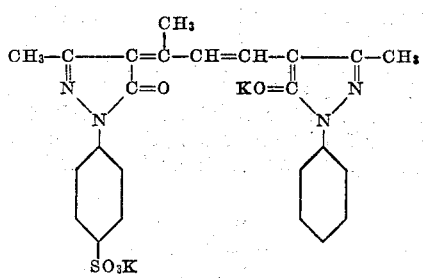

and which can be salted out by potassium acetate.

*Example 11*

Instead of the 1-p-sulpho-phenyl-3-methyl-5-pyrazolone employed in Example 10 1-p-carboxy-phenyl-3-methyl-5-pyrazolone is used. A water soluble carboxylated dyestuff is obtained.

For the manufacture of trimethine dyestuffs in which not only one or both of the end carbon atoms of the trimethine chain, but also the middle carbon atom is substituted by a hydrocarbon radical, it is only necessary to use as the middle component a di-ketone or a ketone-aldehyde in which one of the hydrogen atoms of the methylene group situated between the two carbonyl groups, is substituted by the desired substituent.

*Example 12*

0.02 mol 3-methyl-2-4-pentadione (Journal of the British Chemical Society, vol. 61, page 848) is used instead of the sodium formyl-acetone in Example 1 with the addition of tri-ethylamine. A red dyestuff insoluble in water is obtained, the methylalcoholic solution of which shows a maximum absorption at about 522 $\mu\mu$.

*Example 13*

0.05 mol oxymethylene aceto-phenone (Berichte l. c., vol. 43, page 3338) and 0.1 mol 1-phenyl-3-methyl-5-pyrazolone are dissolved in 15 ccs. of methyl-alcohol. The solution with the addition of tri-ethyl amine as condensing agent is heated in a water bath for 15 hours at about 60° C. The dyestuff thus formed is precipitated by the addition of 20 ccs. of water, thereafter filtered off and washed with water. The dyestuff may be purified by re-dissolving it in benzene and precipitating with petrol ether. Absorption maximum 538 $\mu\mu$ in methyl alcohol.

*Example 14*

0.02 mol oxy-methylene benzalacetone and 0.04 mol 1-phenyl-3-methyl-5-pyrazolone are dissolved in 50 ccs. of methyl alcohol. The solution with the addition of tri-ethyl amine as condensing agent is heated in a water bath for 15 hours at about 60° C. The dyestuff thus formed may be precipitated by the addition of water and has an absorption maximum at 528 $\mu\mu$ in methyl alcohol.

The oxy-methylene benzalacetone used in Example 14 may be prepared by the method described for the preparation of oxy-methylene acetophenone in Berichte, l. c. vol. 43, page 3338 by replacing the acetophenone used therein by benzalacetone.

*Example 15*

0.01 mol thio-barbituric acid and 0.01 mol oxy-methylene acetone-monoanilide are dissolved in 100 ccs. methyl alcohol. The solution is heated in a water bath for 2 hours at about 60° C. Crystals of an orange dye are formed in the hot solution. The crystallisation is completed by cooling, the dye is filtered and washed with methyl alcohol. The dye is the mono-condensation product 5 - acetyl - vinyl -2-thio-2:4:6-triketohexahydropyrimidine of the formula

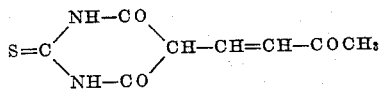

It may be further condensed with thiobarbituric acid or with a different component to yield a symmetrical or an unsymmetrical trimethine dye. The second condensation is preferably carried out in the presence of a condensing agent such as trimethyl-amine or pyridine.

I claim:

1. A bis - [1 - phenyl-3-methyl-5-pyrazolone-(4)-] trimethine dye in which in the trimethine chain one at least of the carbon atoms neighbouring the pyrazolone groups is substituted by a hydrocarbon radical.

2. The process of producing a dye which comprises boiling in an alkaline medium an N-phenyl pyrazolone compound with a substance of the following general formula

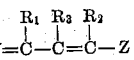

in which $R_1$, $R_2$, $R_3$ stand for a radical selected from the group consisting of H, alkyl and aryl and in which one at least of $R_1$ and $R_2$ stands for a radical selected from the group consisting of alkyl and aryl, Y stands for a radical selected from the group consisting of $=O$, $=N$-aryl and $(-O$-alkyl$)_2$ and Z stands for a radical selected from the group consisting of $-OH$, $-ONa$, $-O$-alkyl, $-O-CO$-alkyl, $-O-CO$-aryl, and arylamine groups.

3. The process of producing a dye which comprises boiling in an alkaline medium barbituric acid with a substance of the following general formula

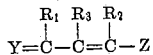

in which $R_1$, $R_2$, $R_3$ stand for a radical selected from the group consisting of H, alkyl and aryl and in which one at least of $R_1$ and $R_2$ stands for a radical selected from the group consisting of alkyl and aryl, Y stands for a radical selected from the group consisting of $=O$, $=N$-aryl and $(-O$-alkyl$)_2$, and Z stands for a radical selected from the group consisting of $-OH$, $-ONa$, $-O$-alkyl, $-O-CO$-alkyl, $-O-CO$-aryl, and arylamine groups.

4. The process of producing a dye which comprises boiling in an alkaline medium a substituted barbituric acid with a substance of the following general formula

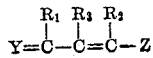

in which $R_1$, $R_2$, $R_3$ stand for a radical selected from the group consisting of H, alkyl and aryl and in which one at least of $R_1$ and $R_2$ stands for a radical selected from the group consisting of alkyl and aryl, Y stands for a radical selected from the group consisting of $=O$, $=N$-aryl and $(-O$-alkyl$)_2$, and Z stands for a radical selected from the group consisting of $-OH$, $-ONa$, $-O$-alkyl, $-O-CO$-alkyl, $-O-CO$-aryl, and arylamine groups.

5. A dye corresponding with the formula:

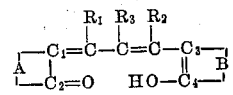

in which

stands for a cyclic oxo compound radical in which A is taken from the group consisting of the non-metallic atoms necessary to complete an N-phenyl pyrazolone, barbituric acid and thiobarbituric acid,

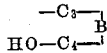

stands for a cyclic hydroxy compound radical in which B is taken from the group consisting of non-metallic atoms necessary to complete an N-phenyl pyrazolone, barbituric acid and thiobarbituric acid, $R_1$, $R_2$ and $R_3$ stand for a radical selected from the group consisting of H, alkyl and aryl one at least of $R_1$ and $R_2$ being a radical selected from the group consisting of alkyl and aryl.

6. The process of producing a dye which comprises boiling in an alkaline medium a compound selected from the groups consisting of N-phenyl pyrazolones, barbituric acids and thiobarbituric acids with a substance selected from the group consisting of substances having the general formulae

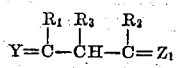

and

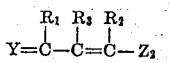

in which $R_1$, $R_2$ and $R_3$ each stand for a radical selected from the group consisting of hydrogen, alkyl and aryl and one at least of $R_1$ and $R_2$ stands for a radical selected from the group consisting of alkyl and aryl, Y and $Z_1$ stand for a member selected from the group consisting of $=O$, $=N$-aryl and $(-O$-alkyl$)_2$, and $Z_2$ stands for a member selected from the group consisting of —OH, —ONa, —O-alkyl, O—CO—alkyl, —O—CO-aryl and NH-aryl groups.

7. The process of producing a dye which comprises boiling in an alkaline medium an N-phenyl pyrazolone compound with a substance selected from the group consisting of substances having the general formulae

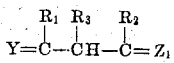

and

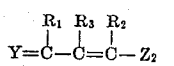

in which $R_1$, $R_2$ and $R_3$ each stand for a radical selected from the group consisting of hydrogen, alkyl and aryl and one at least of $R_1$ and $R_2$ stands for a radical selected from the group consisting of alkyl and aryl, Y and $Z_1$ stand for a member selected from the group consisting of $=O$, $=N$-aryl and $(-O$-alkyl$)_2$, and $Z_2$ stands for a member selected from the group consisting of —OH, —ONa, —O-alkyl, O—CO—alkyl, —O—CO-aryl and NH-aryl groups.

8. The process of producing a dye which comprises boiling in an alkaline medium barbituric acid with a substance selected from the group consisting of substances having the general formulae

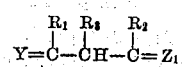

and

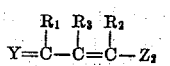

in which $R_1$, $R_2$ and $R_3$ each stand for a radical selected from the group consisting of hydrogen, alkyl and aryl and one at least of $R_1$ and $R_2$ stands for a radical selected from the group consisting of alkyl and aryl, Y and $Z_1$ stand for a member selected from the group consisting of $=O$, $=N$-aryl and $(-O$-alkyl$)_2$, and $Z_2$ stands for a member selected from the group consisting of —OH, —ONa, —O-alkyl, O—CO-alkyl, —O—CO-aryl and NH-aryl groups.

9. The process of producing a dye which comprises boiling in an alkaline medium thiobarbituric acid with a substance selected from the group consisting of substances having the general formulae

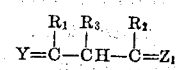

and

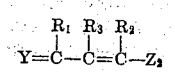

in which $R_1$, $R_2$ and $R_3$ each stand for a radical selected from the group consisting of hydrogen, alkyl and aryl and one at least of $R_1$ and $R_2$ stands for a radical selected from the group consisting of alkyl and aryl, Y and $Z_1$ stand for a member selected from the group consisting of $=O$, $=N$-aryl and $(-O$-alkyl$)_2$, and $Z_2$ stands for a member selected from the group consisting of —OH, —ONa, —O-alkyl, O—CO-alkyl, —O—CO-aryl and NH-aryl groups.

BÉLA GÁSPÁR.